United States Patent [19]
Peeples et al.

[11] 4,248,135
[45] Feb. 3, 1981

[54] HYDRAULIC RATIO CHANGING BOOSTER

[75] Inventors: Denny L. Peeples, Dayton; Donald M. Flory, Arcanum, both of Ohio

[73] Assignee: General Motors Corporation, Detroit, Mich.

[21] Appl. No.: 13,881

[22] Filed: Feb. 22, 1979

[51] Int. Cl.³ .................. E15B 13/10; F15B 17/02
[52] U.S. Cl. ..................................... 91/49; 91/391 R; 91/431; 91/460
[58] Field of Search ............. 91/49, 391 R, 460, 431

[56] References Cited

U.S. PATENT DOCUMENTS

| | | | |
|---|---|---|---|
| 3,699,680 | 10/1972 | Shellhause | 91/431 |
| 3,831,491 | 8/1974 | Thomas | 91/391 R |
| 3,967,538 | 7/1976 | Thomas | 91/460 |
| 3,988,967 | 11/1976 | Orzel | 91/460 |
| 4,007,665 | 2/1977 | Orzel | 91/391 R |
| 4,135,435 | 1/1979 | Adachi | 91/49 |

*Primary Examiner*—Paul E. Maslousky
*Attorney, Agent, or Firm*—D. D. McGraw

[57] ABSTRACT

A hydraulic power booster system in which a hydraulic power brake booster has hydraulic ratio changing mechanisms. The ratio is established by trapping hydraulic fluid in a chamber with an input piston having a larger effective area than an output piston forming movable chamber walls. A ratio piston or sleeve exposed to booster power pressure and the trapped pressure is moved upon power runout, causing the booster ratio to change as the ratio of these pressures change, providing a smooth transition from a high ratio toward a 1:1 ratio as the booster shifts to manual operation from hydraulic power operation. These are three booster modifications shown.

3 Claims, 4 Drawing Figures

HYDRAULIC RATIO CHANGING BOOSTER

The invention relates to a hydraulic booster having a hydraulic ratio changing feature, and more particularly to one in which the ratio is initially established by trapping hydraulic fluid upon initial booster actuation. A sleeve is provided around the ratio changing valve mechanism which will move upon power pressure runout of the booster and cause the booster ratio to proportionally change based on the ratio of the booster power pressure to the hydraulic ratio trapped volume pressure. This provides a smooth transition from power operation to manual operation of the booster.

Figure 1:
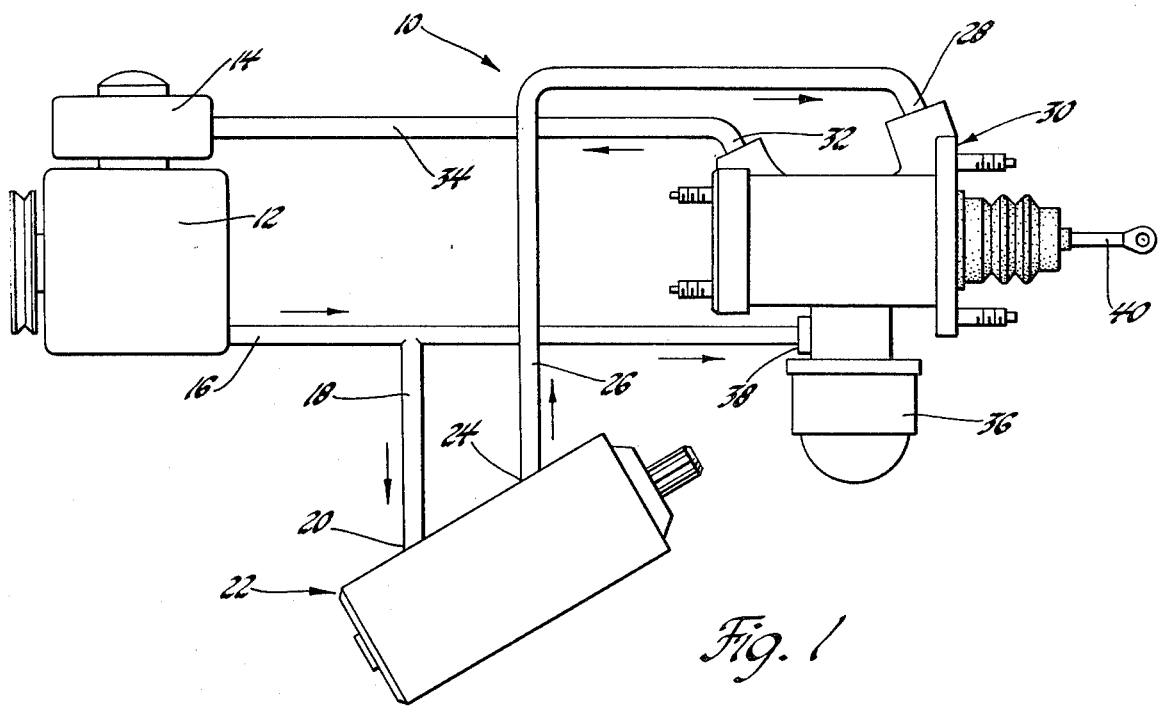
FIG. 1 is a schematic representation of the hydraulic system incorporating a hydraulic brake booster embodying the invention.

The hydraulic system 10 of FIG. 1 is illustrated as being a power steering gear and hydraulic brake booster system of the type utilized in automotive vehicles. The system includes a hydraulic pump 12 having a reservoir 14. The pump outlet conduit 16 has a conduit 18 connected to the inlet 20 of the power steering gear 22. The power steering gear outlet 24 is connected by conduit 26 to the inlet 28 of the hydraulic brake booster 30. The booster outlet 32 is connected by return conduit 34 to the pump reservoir 14. Booster 30 is provided with an accumulator 36 having an inlet 38 to which conduit 16 is also connected. Hydraulic fluid discharged from the pump 12 is therefore provided to the accumulator inlet 38 as well as to the power steering gear inlet 20. Booster 30 is arranged to be operated by movement of an input push rod 40 in a suitable well-known manner such as being connected to a brake pedal for operation by a vehicle operator. The booster is arranged to operate a master cylinder assembly, not shown, so that when the master cylinder is actuated through the booster the brake system is pressurized and the vehicle brakes are energized.

Figure 2:
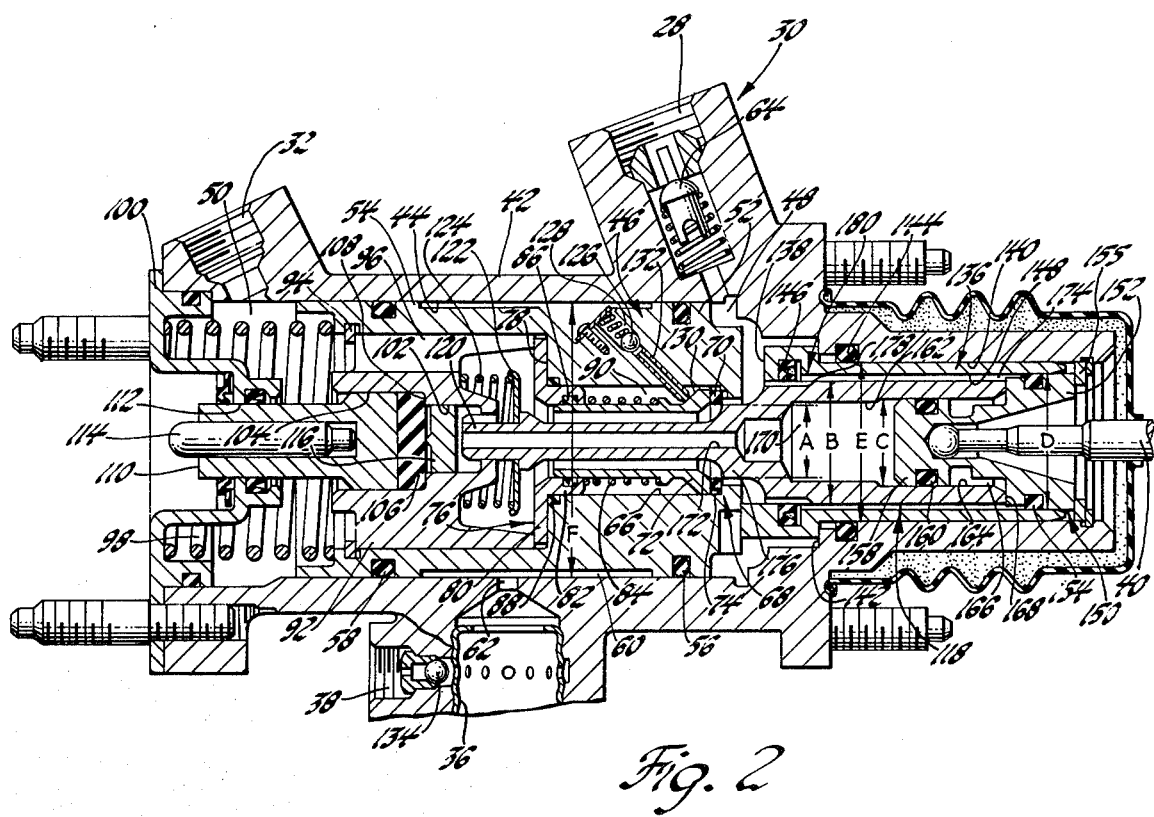
FIG. 2 is a cross sectional view of the hydraulic booster of FIG. 1 showing one embodiment of the invention.

The booster 30 is illustrated in greater detail in FIG. 2. The booster has a housing 42 provided with a bore 44 extending through the housing. A power piston 46 is reciprocably and sealingly received in a portion of bore 44 to divide that bore into several chambers. A power chamber 48 is located in the bore at one end of power piston 46 and an exhaust chamber 50 is located in the bore at the other end of the power piston 46. Power piston 46 has spaced lands 52 and 54 adjacent each end. Land 52 is provided with a seal 56 and land 54 is provided with a seal 58 to seal the piston relative to the bore wall. The annular chamber 60 between lands 52 and 54 outward of the exterior surface of power piston 46 is connected through the accumulator outlet port 62 to the interior of the accumulator 36. Booster hydraulic fluid pressure inlet 28 is connected to power chamber 48 through a check valve 64 which permits flow of fluid into the booster while preventing reverse flow from the booster out of the inlet 28. Power piston 46 has a bore 66 extending axially therethrough and providing fluid communication between power chamber 48 and exhaust chamber 50. An open center control valve 68 is provided in the end of bore 66 opening to power chamber 48. Valve 68 provides for control of the booster in its power operation. A valve seat 70 is mounted in bore 66 and forms a part of valve 68. A sleeve 72 is reciprocably mounted in bore 66 within piston 46 and has one end normally engaging valve seat 70 and holding the valve seat against a shoulder 74 formed within bore 66 at the bore end adjacent power chamber 48. A spring seat and guide 76 is mounted within bore 66 and is seated against a shoulder 78 formed in the bore. Seat and guide 76 has a radially extending flange section 80 engaging shoulder 78 for this purpose. It also has a short cylindrical section 82 extending within the smaller diameter portion of bore 66 toward valve seat 70. A compression spring 84 acts on sleeve 72 and takes reaction on the spring seat and guide 76 to continually urge sleeve 72 and valve seat 70 toward shoulder 74. Suitable seals 86 and 88 are provided between seat and guide 76, sleeve 72, and a portion of the piston 46 so that the chamber 90 is sealed from the exhaust chamber 50, and when valve seat 70 is moved away from engagement with its cooperating shoulder 74, is connected to the power chamber 48. The bore 66 of the power piston 46 has an enlarged forward end containing a reaction housing 92 held in place by a suitable retainer 94. Housing 92 has its rear end abutting seat and guide flange 80, holding the seat and guide in axial position. A passage 96 extending through the housing 92 forms a part of the exhaust chamber 50. A piston return spring 98 is contained in exhaust chamber 50 and urges the power piston toward the power chamber 48. The forward end of bore 44 is closed by an end wall and spring seat 100, against which spring 98 is seated. Reaction housing 92 has a bore 102 extending axially therethrough, with the forward, larger bore portion 104 having a reaction disc 106 received therein and abutting the bore shoulder 108. A reaction plunger 110 is contained in bore portion 104 and extends forwardly and out of the power piston 46. The rear surface of plunger 110 engages the entire forward surface of reaction disc 106. Plunger 110 extends through a sealed opening 112 formed axially in the end wall 100 and also contains an output member 114 which is arranged to actuate the master cylinder assembly, not shown. The portion of bore 102 rearwardly of shoulder 108 is of smaller diameter than bore portion 104. A reaction piston 116 is reciprocably mounted in this bore portion and has a forward surface engageable with the center part of the rearward surface of the reaction disc 106. An input valve member 118, to be described in greater detail below, extends through the valve seat 70 and sleeve 72. The input valve member output end 120 extends into the rear portion of bore 102 so that it is engageable with reaction piston 116. A spring seat 122 is positioned on a shoulder formed on the input valve member 118 adjacent to but rearwardly of its output end 120, and provides a seat for a spring 124 which takes reaction on the rearward side of reaction housing 92. Spring 124 therefore continually urges the input valve member 118 rearwardly or rightwardly as seen in FIG. 2.

An accumulator control valve 126 is positioned in a passage 128 formed in power piston 46 so that it extends radially inwardly and axially rearwardly from annular chamber 60 to the portion of chamber 90 immediately forward of valve seat 70. A valve seat is provided for valve 126 in passage 128, and the valve is spring-loaded to normally engage its seat. Accumulator pressure will act on the valve 126 to assist in keeping the valve closed against its seat. Sleeve 72 is provided with a ramp 130 at its rearward end which is engaged by a valve operating plunger 132. It can be seen that when sleeve 72 is moved forwardly, ramp 130 acts on plunger 132 and causes valve 126 to open, allowing accumulator pressure to enter the power chamber 48 through chamber 60, passage 128, chamber 90, and past the outer periphery of valve seat 70, which is lifted off its shoulder 74 when sleeve 72 moves forwardly. A check valve 134 is provided in the accumulator inlet 38 so that pressure may be introduced into the accumulator 36 from pump 12, but is prevented from flowing from the accumulator outwardly through inlet 38.

The booster ratio changing mechanism is positioned in the rearward portion of the booster. It includes a ratio piston 136 having a slightly enlarged forward end 138. Piston 136 is reciprocably and sealingly received in the bore portion 140 of bore 44 formed in housing 42. The enlarged forward end 138 of piston 136 extends into the power pressure chamber 48 so that this end of the ratio piston is exposed to hydraulic pressure in the power chamber. End 138 is normally engaged with a shoulder 142 formed on a part of housing 42. Seal 144 is provided in a groove formed in a part of the housing bore adjacent to but slightly rearwardly of shoulder 142 and sealing the housing and the outer surface of ratio piston 136. A V-block type seal 146 is contained in a groove formed within piston end 138 and extends somewhat radially inwardly of the piston 136 relative to the wall of the ratio piston bore 148. Bore 148 extends through the ratio piston 136 and provides a cylindrical wall which receives an input member 150 in reciprocal sealing relation. Input member 150 is formed with a larger after land 152 having a seal 154 received in an outer groove therein. Land 152 and seal 154 sealingly engage the cylindrical wall formed by bore 148. The input member is limited in its rearward movement by stop member 155. A smaller forwardly extending land 158 provides a piston head on the forward end of input member 150. A seal 160 is provided in a groove formed in the outer periphery of land 158.

The input valve member 118 has the bore 162 formed therein, the after portion of which is formed to provide a bore cylinder section 164 in which the forward end 158 of input valve member 118 is sealingly and reciprocably received. The rear end 166 of bore cylindrical section 164 opens through the input end 168 of the input valve member 118. Input end 168 is engageable in force transmitting relation by the forward side of the input member land 152. The chamber 170 is formed by a portion of bore 162 immediately forward of the input member forward end 158. This chamber is connected by the forward bore portion 172 to the exhaust chamber 50, the forward end of bore portion 172 opening through the input valve member output 120. The portion of input valve 118 containing the bore cylinder section 164 and chamber 170 is positioned within bore 148 but somewhat radially spaced inwardly therefrom so that a chamber 174 is provided between input member land 152, input valve member 118 and bore 148. Somewhat forward of the portion of input valve member 118 forming chamber 170 there is a valve portion 176 formed on the exterior part of the valve member 118 and cooperating with valve seat 70 to form the open center control valve 68. In the released position of the booster illustrated in FIG. 2, valve portion 176 is axially spaced from valve seat 70 so that hydraulic fluid may freely flow from the power chamber 48 past the valve portion 176 and valve seat 70, into exhaust chamber 50 and out of the hydraulic outlet 32 to conduit 34 and the pump reservoir 14. The exterior surface of input valve member 118 radially outward of the area in which chamber 170 is formed has another valve portion 178 provided thereon. This valve portion cooperates with the seal 146, which acts as a valve seat, to define the hydraulic ratio control valve 180. This is also a normally open control valve. The effective area of valve seat 70 and valve portion 176 has an area A identified in FIG. 2 as diameter A. The effective area of seal 146 acting as a valve seat and of the other valve portion 178 is identified as effective area B, shown as diameter B in FIG. 2. Effective area C of the forward end or head 158 of input member 150 is shown in FIG. 2 as diameter C. The effective area D of the land 152 of input member 150, as well as bore 148, is identified by diameter D in FIG. 2. The effective area E of the ratio piston 136 and bore 140 is identified in FIG. 2 by diameter E. The effective area F of the power piston 46 is identified in FIG. 2 as diameter F. In the particular construction of FIG. 2, area A is the smallest area, area C is larger than area A but smaller than area B, area D is larger than area C but smaller than area E, and area F is larger than area E.

The booster is illustrated in FIG. 2 in the released position. In this position, with pump 12 operating, hydraulic fluid is circulated through the power steering gear 22 and the booster 30 at relatively low pressure. When the power steering gear 22 or the brake booster 30 is actuated, a back pressure is generated upstream of the actuated mechanism, causing the pump 12 to produce a controlled power pressure in the pump conduit 16 and other conduits and passages upstream of the actuated mechanism. It can be seen that when pressure is induced in conduit 16, it is directed through inlet 38 and accumulator valve 134 so that it will charge the accumulator 36 if the accumulator charge is below the induced pressure. If the accumulator is fully charged and the induced pressure does not reach the value of the charge, valve 134 remains closed.

During normal booster operation, hydraulic fluid enters inlet 28 and passes through check valve 64 into power chamber 48. It passes through the open center control valve 68 and into the exhaust chamber 50 where it then passes through outlet 32 and conduit 34 to return to the pump reservoir 14. Initiation of booster actuation is accomplished by forward movement of the input push rod 40. This movement would be leftward as seen in the drawings. Initial forward movement of rod 40 causes forward movement of the input member 150. This member engages the input end 168 of input valve member 118, moving the valve portion 176 toward engagement with its cooperating valve seat 70, causing the open center control valve 68 to become restricted or closed and therefore inducing a buildup of power pressure in power chamber 48. This pressure will act against the power piston 46 and urge the power piston leftwardly as seen in FIG. 2. The leftward or forward movement of input valve member 118 also moves the valve portion 178 so that it is engaged by the valve seal 146, acting as a valve seat, to close the hydraulic ratio control valve 180. This traps hydraulic fluid in the trapped volume chamber 174. After this fluid is so trapped, further leftward movement of input member 150 will result in a higher rate of leftward movement of the input valve member 118. The ratio of movement bears the same relation as does the relation of effective areas C and D. Thus, the input member 150, as well as the push rod 40 and the brake pedal connected to the push rod, will have to move a smaller distance to obtain a specified amount of movement of input valve member 118 and therefore of power piston 46, than would be the case if a 1:1 ratio between the input member 150 and the valve portion 176 were utilized.

If the booster is operated to power runout, or when pump 12 is not operable to provide pressure at inlet 28, the valve portion 176 will engage valve seat 70 in a force transmitting relation and additional movement of the input member 150 will then cause leftward movement of sleeve 72 against the force of sleeve spring 84. This will cause the ramp 130 to move plunger 132 so as to unseat the accumulator valve 126, opening the accumulator so that accumulator pressure enters the power chamber 48 to further actuate the booster, assuming that accumulator charged pressure is greater than the pressure then in chamber 48. This normally occurs when there is a small amount of hydraulic pressure available from pump 12 or if for some reason pump 12 is unable to provide hydraulic pressure. Of course, the check valve 64 closes inlet 28, preventing the loss of accumulator hydraulic pressure backward through inlet 28.

At times it becomes necessary to actuate the master cylinder at the output end of the booster 30 manually by pushing through the booster. This occurs when there is no or insufficient pressure from pump 12 and the pressure from the accumulator 36 has been used. In this condition, further leftward movement of input member 150 tends to pressurize the fluid in chamber 174 and cause that fluid pressure to act on ratio piston 136 across a differential area represented by the difference between areas B and D to move the ratio piston 136 leftwardly as seen in FIG. 2 within power chamber 48. The pressure in the power chamber is no longer able to hold the ratio piston 136 in engagement with shoulder 142 as illustrated in FIG. 2. The ratio of pressures in chambers 48 and 174 therefore smoothly changes the booster ratio from the higher ratio of movement of input member 150 to input valve member 118 toward a 1:1 ratio based on the ratio of the pressures in chambers 174 and 48. Also, the input valve member 118 will have its output end 120 engaging the reaction piston 116, closing off chamber 170 so that movement of the input member 150 acts through a trapped hydraulic link formed by the fluid in chamber 170 and the portion of the bore 162 leading forwardly in the input valve member to the valve member output end 120, so that there is a 1:1 movement of the input member 150 and the input valve member 118. The force is then transmitted directly from the push rod 40 through these members and links to the output member 114 so that the output member 114 moves at a 1:1 ratio with the input push rod 40.

Figure 3:
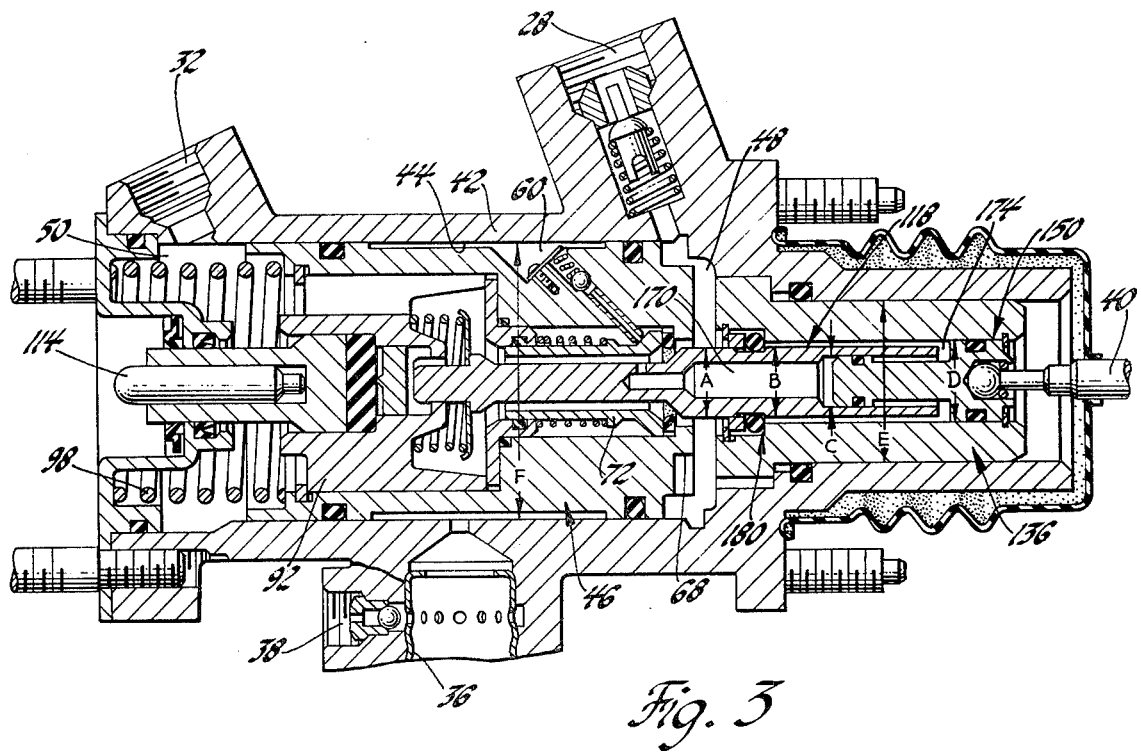
FIG. 3 is a cross section view of a modification of the booster of FIG. 2 showing another embodiment of the invention.

The modified booster illustrated in FIG. 3 is quite similar to the booster of FIG. 2 and only the major portions of the booster are identified by similar reference characters. It also uses a different hydraulic ratio control valve which is self-venting. This is the subject of a separate application Ser. No. 013,826 filed Feb. 22, 1979 by a different inventive entity. In this particular booster the effective area A is slightly smaller than the effective area B, the effective area C is smaller than effective area A, effective area D is larger than area B, effective area E is larger than area D, and effective area F is larger than area E. Also, in this booster there is no provision for trapping fluid in the chamber immediately forward of the head or forward end of the input member. Therefore, there is no hydraulic link set up at this point.

Figure 4:
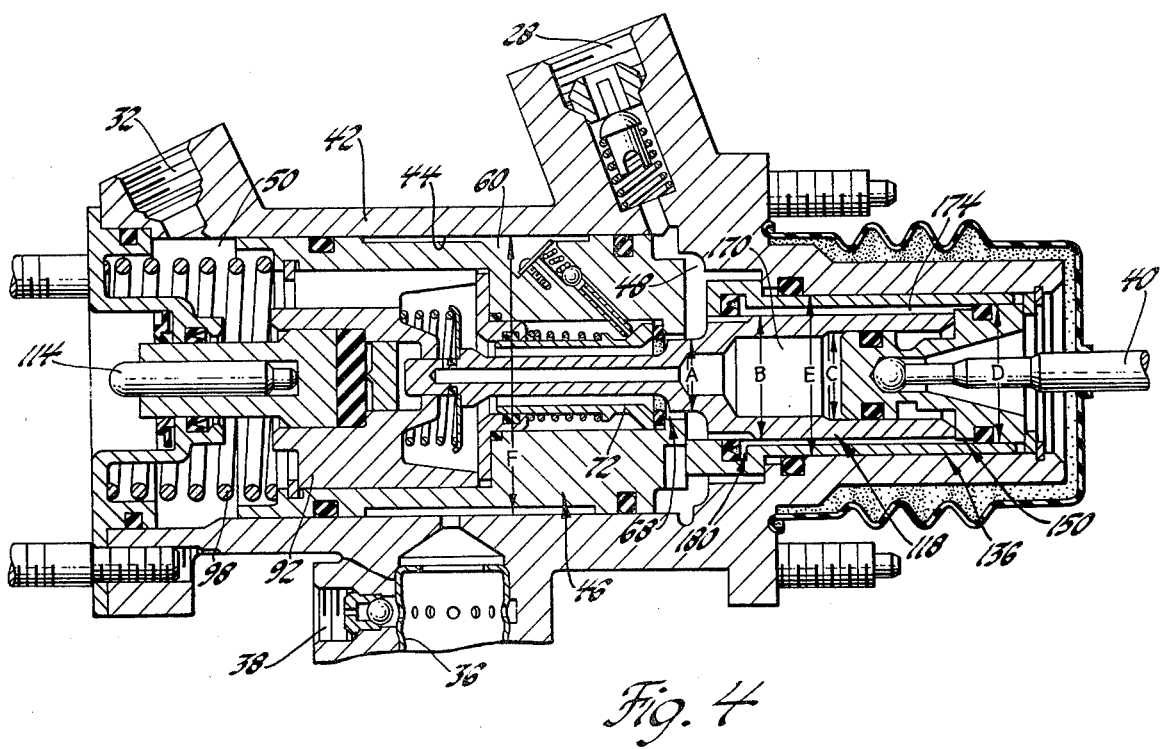
FIG. 4 is a cross section view of a modification of the booster of FIG. 2 and showing yet another embodiment of the invention.

The modified booster illustrated in FIG. 4 is similar to the booster of FIG. 2 but in this particular instance the effective area C is larger than effective area A but smaller than effective area D. As before, area D is larger than area B, area E is still larger than area D, and area F is larger than area E. This particular arrangement is illustrative of the various ratios of the effective areas that may be utilized in accordance with the invention. Since the booster is generally similar to that of FIG. 2, only the major portions of the booster are identified by corresponding reference characters. The booster has a somewhat different arrangement for trapping fluid in the chamber within the input valve member and forward of the input member head. The invention represented by the arrangements for trapping fluid as shown in FIGS. 2 and 4, are that of another inventive entity and are covered by a separate patent application Ser. No. 013,880 filed Feb. 22, 1979.

The embodiments of the invention in which an exclusive property or privilege is claimed are defined as follows:

1. In a hydraulic ratio changing hydraulic booster having a housing, said housing having a bore therethrough, a power piston reciprocably mounted in said bore and defining therewith a power chamber and an exhaust chamber, a hydraulic pressure inlet connected to said power chamber to provide hydraulic fluid pressure to said power chamber, a hydraulic fluid outlet connected to said exhaust chamber, and open center control valve means for controlling power pressure in said power chamber and providing controlled fluid communication between said power chamber and said exhaust chamber, the improvement comprising:

a first valve seat on said power piston forming a part of said open center control valve means and having an effective valve area A;

an input valve member movable in said housing and extending into said power piston and through said power chamber and having a first valve portion thereon having an effective valve area A cooperating with said first valve seat and defining therewith said open center control valve means, said input valve member having a second valve portion thereon having an effective valve area B at least as large as valve area A, a bore formed in said input valve member and forming a cylindrical section in one bore end having an area C different from valve area A and smaller than valve area B, an input end through which said cylindrical section opens, and an output end through which said input valve member bore opens into said exhaust chamber;

a generally cylindrical ratio piston reciprocably received in said housing bore axially opposite said power piston and having one end exposed to said power chamber, said ratio piston receiving said input end and said second valve portion of said input valve member therein and having a second valve seat cooperating with said second valve portion to define an open center hydraulic ratio control valve, said ratio piston having an inner area D larger than area B, and further having an outer area E larger than area D;

said power piston and the portion of said housing bore receiving said power piston having an area F larger than area E, said power piston having an output member connected to be movable therewith;

an input member formed as a stepped piston with a forward end having an area C and extending into said input valve member bore end having an area C, a rear end having an area D and extending into said ratio piston inner area D and also being axially engageable with said input end of said input valve member;

and an input push rod connected with said input member and movable to control said booster;

said input push rod being moved to actuate said booster, moving said input member and said input valve member to restrict or close said booster open center control valve means and cause a pressure increase in said power chamber acting to move said power piston and said output member while said open center hydraulic ratio control valve remains open, said input valve member further moving relative to said ratio piston a sufficient amount to close said open center hydraulic ratio control valve and trap hydraulic fluid within said ratio piston between said ratio piston and said input member and said input valve member, further movement of said input member in the booster actuating direction causing an increase in pressure in the trapped hydraulic fluid and movement of said input valve member at a faster rate than movement of said input member in accordance with the ratio of area D less area C to area B less area C, increasing the ratio of booster power output to input;

and, upon sufficient trapped fluid pressure being built up relative to power pressure in said power chamber, causing movement of said ratio piston toward said power piston and proportionally changing the booster ratio from a first ratio to a different ratio based on the ratio of trapped fluid pressure to power chamber pressure.

2. In a hydraulic ratio changing hydraulic booster having a housing, said housing having a bore therethrough, a power piston reciprocably mounted in said bore and defining therewith a power chamber and an exhaust chamber, a hydraulic pressure inlet connected to said power chamber to provide hydraulic fluid pressure to said power chamber, a hydraulic fluid outlet connected to said exhaust chamber, and open center control valve means for controlling power pressure in said power chamber and providing controlled fluid communication between said power chamber and said exhaust chamber, the improvement comprising:

a first valve seat on said power piston forming a part of said open center control valve means and having an effective valve area A;

an input valve member movable in said housing and extending into said power piston and through said power chamber and having a first valve portion thereon having an effective valve area A cooperating with said first valve seat and defining therewith said open center control valve means, said input valve member having a second valve portion thereon having an effective valve area B larger than valve area A, a bore formed in said input valve member and forming a cylindrical section in one bore end having an area C larger than valve area A but smaller than valve area B, an input end through which said cylindrical section opens, and an output end through which said input valve member bore opens into said exhaust chamber;

a generally cylindrical ratio piston reciprocably received in said housing bore axially opposite said power piston and having one end exposed to said power chamber, said ratio piston receiving said input end and said second valve portion of said input valve member therein and having a second valve seat formed therein with a valve area B and cooperating with said second valve portion to define an open center hydraulic ratio control valve, said ratio piston having an inner area D larger than area B, and further having an outer area E larger than area D;

said power piston and the portion of said housing bore receiving said power piston having an area F larger than area E, said power piston having an output member connected to be movable therewith;

an input member formed as a stepped piston with a forward end having an area C and extending into said input valve member bore end having an area C, a rear end having an area D and extending into said ratio piston inner area D and also being axially engageable with said input end of said input valve member;

and an input push rod connected with said input member and movable to control said booster;

said input push rod being moved to actuate said booster, moving said input member and said input valve member to restrict or close said booster open center control valve means and cause a pressure increase in said power chamber acting to move said power piston and said output member while said open center hydraulic ratio control valve remains open, said input valve member further moving relative to said ratio piston a sufficient amount to close said open center hydraulic ratio control valve and trap hydraulic fluid within said ratio piston between said ratio piston and said input member and said input valve member, further movement of said input member in the booster actuating direction causing an increase in pressure in the trapped hydraulic fluid and movement of said input valve member at a faster rate than movement of said input member in accordance with the ratio of area D less area C to area B less area C, increasing the ratio of booster power output to input;

and, upon sufficient trapped fluid pressure being built up relative to power pressure in said power chamber, causing movement of said ratio piston toward said power piston and proportionally changing the booster ratio from a first ratio to a higher ratio based on the ratio of trapped fluid pressure to power chamber pressure.

3. In a hydraulic ratio changing hydraulic booster having a housing, said housing having a bore therethrough, a power piston reciprocably mounted in said bore and defining therewith a power chamber and an exhaust chamber, a hydraulic pressure inlet connected to said power chamber to provide hydraulic fluid pressure to said power chamber, a hydraulic fluid outlet connected to said exhaust chamber, and open center control valve means for controlling power pressure in said power chamber and providing controlled fluid communication between said power chamber and said exhaust chamber, the improvement comprising:

a first valve seat on said power piston forming a part of said open center control valve means and having an effective valve area A;

an input valve member movable in said housing and extending into said power piston and through said power chamber and having a first valve portion thereon having an effective valve area A cooperating with said first valve seat and defining therewith said open center control valve means, said input valve member having a second valve portion thereon having an effective valve area B at least as large as valve area A, a bore formed in said input valve member and forming a cylindrical section in one bore end having an area C smaller than valve areas A and B, an input end through which said cylindrical section opens, and an output end through which said input valve member bore opens into said exhaust chamber;

a generally cylindrical ratio piston reciprocably received in said housing bore axially opposite said power piston and having one end exposed to said power chamber, said ratio piston receiving said input end and said second valve portion of said input valve member therein and having a second valve seat cooperating with said second valve portion to define an open center hydraulic ratio control valve, said ratio piston having an inner area D larger than area B, and further having an outer area E larger than area D;

said power piston and the portion of said housing bore receiving said power piston having an area F larger than area E, said power piston having an output member connected to be movable therewith;

an input member formed as a stepped piston with a forward end having an area C and extending into said input valve member bore end having an area C, a rear end having an area D and extending into said ratio piston inner area D and also being axially engageable with said input end of said input valve member;

and an input push rod connected with said input member and movable to control said booster;

said input push rod being moved to actuate said booster, moving said input member and said input valve member to restrict or close said booster open center control valve means and cause a pressure increase in said power chamber acting to move said power piston and said output member while said open center hydraulic ratio control valve remains open, said input valve member further moving relative to said ratio piston a sufficient amount to close said open center hydraulic ratio control valve and trap hydraulic fluid within said ratio piston between said ratio piston and said input member and said input valve member, further movement of said input member in the booster actuating direction causing an increase in pressure in the trapped hydraulic fluid and movement of said input valve member at a faster rate than movement of said input member in accordance with the ratio of area D less area C to area B less area C, increasing the ratio of booster power output to input;

and, upon sufficient trapped fluid pressure being built up relative to power pressure in said power chamber, causing movement of said ratio piston toward said power piston and proportionally changing the booster ratio from a first ratio to a higher ratio based on the ratio of trapped fluid pressure to power chamber pressure.

* * * * *